US008001929B2

(12) United States Patent
Petersen

(10) Patent No.: US 8,001,929 B2
(45) Date of Patent: Aug. 23, 2011

(54) SYSTEM FOR MANAGING A GROUP OF DAIRY ANIMALS

(75) Inventor: Gerth Petersen, Rodekro (DK)

(73) Assignee: Maasland N.V., Maassluis (NL)

( * ) Notice: Subject to any disclaimer, the term of this patent is extended or adjusted under 35 U.S.C. 154(b) by 236 days.

(21) Appl. No.: 12/443,499

(22) Filed: Mar. 30, 2009

(65) Prior Publication Data

US 2010/0012038 A1    Jan. 21, 2010

Related U.S. Application Data

(63) Continuation of application No. PCT/NL2007/000238, filed on Sep. 24, 2007.

(30) Foreign Application Priority Data

Oct. 3, 2006  (NL) ..................................... 1032611

(51) Int. Cl.
*A01J 5/00* (2006.01)
(52) U.S. Cl. ............... 119/14.02; 119/14.01; 119/14.18; 119/840
(58) Field of Classification Search ............... 119/14.02, 119/14.03, 14.08, 14.1, 14.18, 840; 700/245, 700/248, 90
See application file for complete search history.

(56) References Cited

U.S. PATENT DOCUMENTS

| | | | | |
|---|---|---|---|---|
| 3,223,070 A | * | 12/1965 | Gribble et al. ............. | 119/14.03 |
| 3,570,448 A | * | 3/1971 | Gates ........................... | 116/308 |
| 4,517,923 A | * | 5/1985 | Palmer ....................... | 119/51.02 |
| 6,470,825 B1 | * | 10/2002 | Johnson et al. ............ | 119/51.02 |
| 6,516,744 B1 | * | 2/2003 | Bjork et al. ................ | 119/14.02 |
| 6,520,112 B2 | * | 2/2003 | van der Lely et al. ..... | 119/14.02 |
| 7,484,474 B2 | * | 2/2009 | Van Den Berg et al. ... | 119/14.02 |
| 7,785,267 B2 | * | 8/2010 | Francke et al. ............. | 600/551 |
| 7,836,850 B2 | * | 11/2010 | Pratt ........................... | 119/174 |
| 2004/0103847 A1 | * | 6/2004 | Larsen ....................... | 119/51.02 |
| 2006/0180093 A1 | * | 8/2006 | Cross et al. ................ | 119/720 |
| 2006/0283269 A1 | * | 12/2006 | Anderson et al. ........... | 73/863.31 |
| 2008/0109266 A1 | * | 5/2008 | Bjork et al. ................ | 705/7 |

(Continued)

FOREIGN PATENT DOCUMENTS

EP         1213676 A    6/2002

(Continued)

*Primary Examiner* — Rob Swiatek
*Assistant Examiner* — Ebony Evans
(74) *Attorney, Agent, or Firm* — Caroline J. Haitjema; David P. Owen; Hoyng Monegier LLP

(57) ABSTRACT

A system for managing a group of dairy animals to be milked fully automatically, where the dairy animals go through a lactation cycle comprising phases of calving, inmilking, producing milk, and being dry. The system includes a computer executing program instructions for recording information and processing data indicating a division of the group of dairy animals into subgroups of a plurality of dairy animals, an insemination period determined per subgroup within which the dairy animals of the subgroup concerned are to be inseminated, which insemination period is so short that substantially all dairy animals in the subgroup concerned go simultaneously through the lactation cycle, and a separation of pregnant dairy animals of at least one of the subgroups in a separate area, around the beginning of the being dry phase of the subgroup concerned. The system also includes at least one milking robot for automatically milking the dairy animals, operatively connected to the computer for receiving first instructions from the computer for milking the dairy animals in the non-separated subgroups, and second instructions from the computer for milking the dairy animals in the separated subgroup in the separate area.

17 Claims, 3 Drawing Sheets

U.S. PATENT DOCUMENTS

| | | |
|---|---|---|
| 2008/0154568 A1* | 6/2008 | Burghardi et al. .............. 703/11 |
| 2008/0215167 A1* | 9/2008 | Beck .............................. 700/90 |
| 2009/0013934 A1* | 1/2009 | Francke et al. ............ 119/14.02 |
| 2009/0229530 A1* | 9/2009 | Pratt ............................ 119/174 |
| 2009/0288605 A1* | 11/2009 | De Villiers ................. 119/14.02 |

FOREIGN PATENT DOCUMENTS

WO     2004/068940 A1     8/2004

* cited by examiner

SYSTEM FOR MANAGING A GROUP OF DAIRY ANIMALS

This application is a continuation of international application no. PCT/NL2007/000238, filed on Sep. 24, 2007, and claims priority from Netherlands application no. 1032611 filed on Oct. 3, 2006. The contents of both applications are hereby incorporated by reference in their entirety.

BACKGROUND OF THE INVENTION

1. Field of the Invention

The present invention relates to a system and method of managing a group of dairy animals to be milked fully automatically.

2. Description of the Related Art

Dairy animals go through a lactation cycle that comprises a number of phases. Calving is at the beginning of the lactation cycle. By calving and the pregnancy preceding the calving the milk production in an udder of the dairy animal is started. Calving is followed by inmilking, or starting up the milk production, in the beginning of which phase colostrum is produced. This is a transition to a phase of producing milk. During the latter phase, a dairy animal will be inseminated again, provided it is still in a proper condition for this purpose. At the end of the phase of producing milk, the milking is reduced and the dairy animal will be dry during some time in preparation of the next calving.

In a generally known method, dairy animals are milked fully automatically by means of a milking robot during the phase of producing milk. Prior to calving, a dairy animal is separated from the group.

The current method of managing a group of dairy animals has the drawback that the dairy animals that are dried up disturb the production process around the milking robots.

BRIEF SUMMARY OF THE INVENTION

The present invention aims at providing a solution for the above-mentioned problem, or at providing at least an alternative.

This object is achieved by the invention with a system for managing a group of dairy animals to be milked fully automatically, where the dairy animals go through a lactation cycle comprising phases of calving, inmilking, producing milk, and being dry. The system includes a computer executing program instructions for recording information and processing data indicating a division of the group of dairy animals into subgroups of a plurality of dairy animals, an insemination period determined per subgroup within which the dairy animals of the subgroup concerned are to be inseminated, which insemination period is so short that substantially all dairy animals in the subgroup concerned go simultaneously through the lactation cycle, and a separation of pregnant dairy animals of at least one of the subgroups in a separate area, around the beginning of the being dry phase of the subgroup concerned. The system also includes at least one milking robot for automatically milking the dairy animals, operatively connected to the computer for receiving first instructions from the computer for milking the dairy animals in the non-separated subgroups, and second instructions from the computer for milking the dairy animals in the separated subgroup in the separate area.

The system may include a first milking robot operatively connected to the computer for receiving first instructions from the computer for milking the dairy animals in the non-separated subgroups, and a second milking robot for automatically milking the dairy animals in the separate area, the second milking robot operatively connected to the computer for receiving second instructions from the computer for milking the dairy animals in the separated subgroup.

In some embodiments the second instructions received by the at least one milking robot may be for milking the dairy animals of the separated subgroup at a decreasing frequency in order to dry up the dairy animals of the separated subgroup. In some embodiments the second instructions received by the at least one milking robot may be for milking the dairy animals of the separated subgroup at an increased frequency during inmilking. The system may also further include a selection robot operatively connected to the computer for automatically separating the pregnant dairy animals of the at least one subgroup.

The computer may record information and send instructions to the at least one milking robot indicating placement of the separated subgroup out of the separate area after being dry and calving. The computer may record information and send instructions to the at least one milking robot indicating separation of at least one of the subgroups from the group until at least after the inmilking, and may record information and send instructions to the at least one milking robot indicating separation of at least one of the subgroups from the group during a first part of the lactation cycle after calving in which the milk production increases, and milking at a higher frequency than dairy animals in the rest of the group. Furthermore, the computer may record information and send instructions to the at least one milking robot relating to classification of dairy animals of a subgroup which have not become pregnant after insemination into an other subgroup in order to be inseminated again together with the dairy animals of this other subgroup.

The invention also relates to a computer usable medium having computer readable program instructions embodied therein for recording information and processing data, and for issuing instructions, as defined for the system described above.

The invention also encompasses a method of managing a group of dairy animals to be milked fully automatically, which dairy animals go through a lactation cycle comprising phases of calving, inmilking, producing milk, and being dry. The method includes dividing the group of dairy animals into subgroups of a plurality of dairy animals, determining per subgroup an insemination period within which the dairy animals of the subgroup concerned are inseminated, which insemination period is so short that substantially all dairy animals in the subgroup concerned go simultaneously through the lactation cycle, separating all pregnant animals of at least one of the subgroups in a separate area, around the beginning of the being dry phase of the subgroup concerned, fully automatically milking the dairy animals in the non-separated subgroups by means of at least one milking robot, separately milking the dairy animals in the separated subgroup, and placing the separated subgroup out of the separate area after being dry and calving.

Thanks to the inventive method steps, each subgroup of dairy animals goes more or less simultaneously through the lactation cycle. By separating in each case a subgroup when this subgroup is about to be dried up, dairy animals of this group are prevented from reporting at a milking robot at their customary moments. In the method according to the state of the art, the milking robot will recognize the dairy animal concerned as an animal to be dried up and will not allow it to enter the milking robot. This results in delay for dairy animals that should still be milked. This delay is prevented, or at least reduced, thanks to the inventive method.

Favorable embodiments are also provided. In particular, at least one of the subgroups, after calving, remains separated from the group at least during the inmilking. This makes it possible to separate the colostrum in a simple manner from the normal milk.

More in particular, the at least one subgroup, after calving, also remains separated from the group during a first part of the lactation cycle in which the milk production increases, and is milked at a higher frequency than dairy animals in the rest of the group. This makes it easier to increase the milk production and to give extra attention and adapted feeding that is attuned to the specific needs of the subgroup concerned.

In one embodiment, dairy animals of a subgroup which have not become pregnant after insemination are classified into an other subgroup in order to be inseminated again together with the dairy animals of this other subgroup. It is thus prevented that there will still be dairy animals having an individual lactation cycle, which animals would have to be managed individually.

In a favorable embodiment, the separated subgroup is milked fully automatically by means of a separate milking robot, which milking robot is controlled to milk at a decreasing frequency in order to dry up the dairy animals of the separated subgroup. This means that less manpower is needed to look after and to support the subgroup to be dried up.

Advantageously, the subgroups have mutually a substantially equal group size. This makes it possible to design and utilize the shed sizes in an optimum manner.

The invention further relates to a software program comprising program instructions for processing data and providing information for performing the inventive method, when the software program is loaded in a computer. The invention further relates to a computer. In particular, the computer is operatively connected to a milking robot that is designed to milk the dairy animals of the separated subgroup, wherein the computer supplies instructions to the milking robot in order to milk the dairy animals of the separated subgroup at a decreasing frequency. In one embodiment, the computer is further operatively connected to a selection robot, in order to automatically select and separate dairy animals belonging to the subgroup to be separated, from the group.

BRIEF DESCRIPTION OF THE DRAWINGS

The invention is explained in further detail with reference to the accompanying drawings of an exemplary embodiment, in which.

DESCRIPTION OF ILLUSTRATIVE EMBODIMENTS

Figure 1:
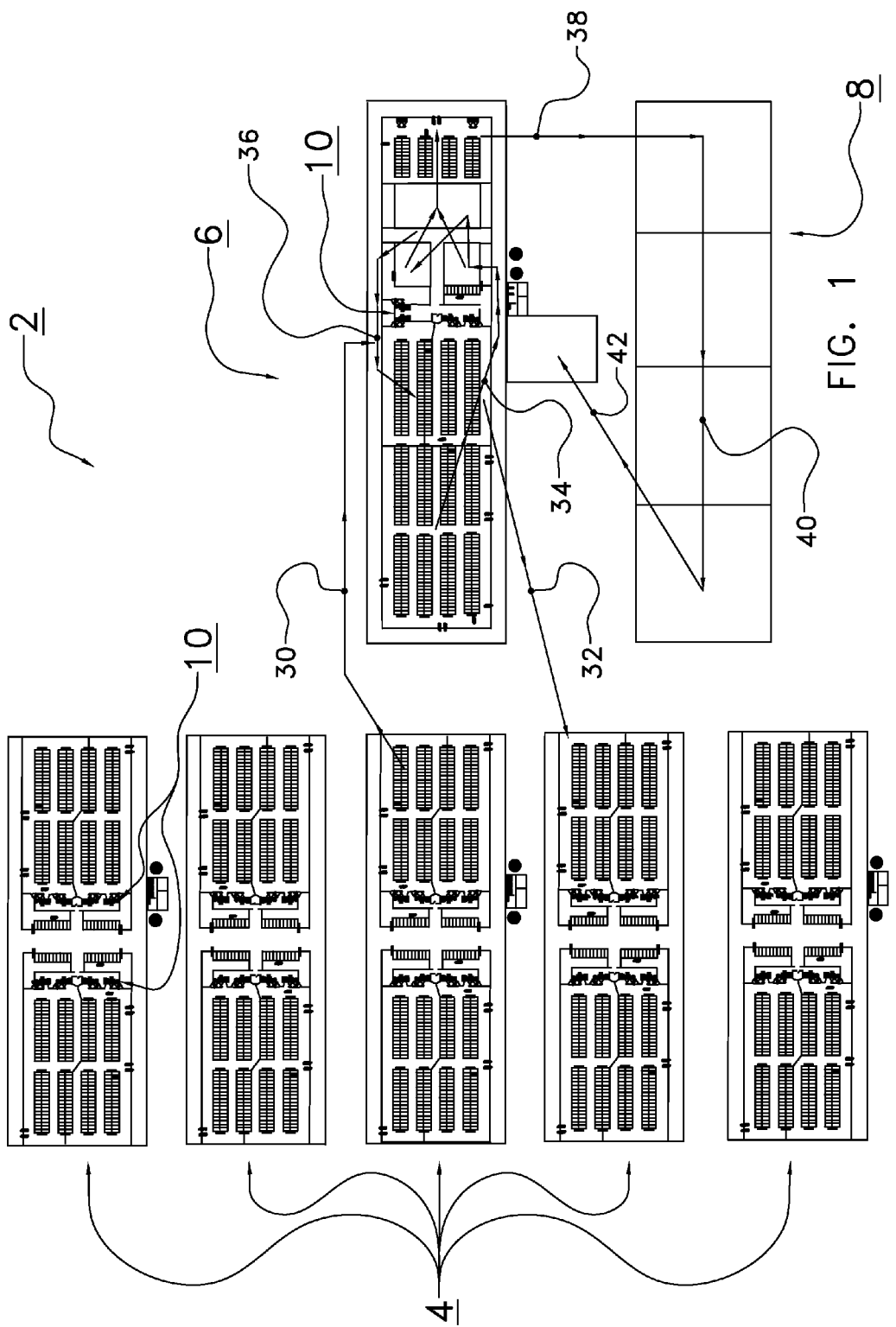
FIG. 1 is a schematic view of a dairy farm.
Figure 2:
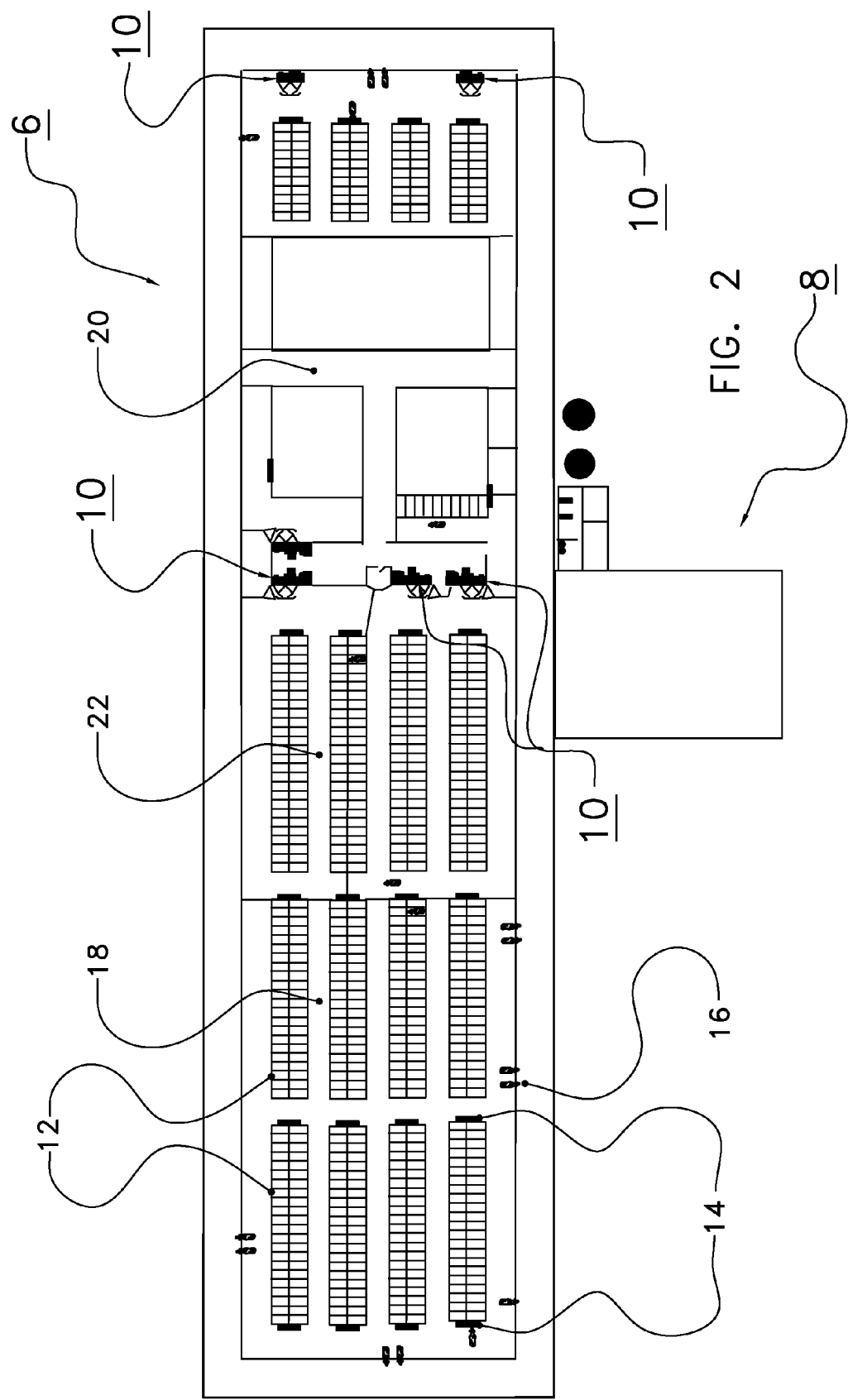
FIG. 2 shows a calving shed from the overall view of FIG. 1.

The following is a description of certain embodiments of the invention, given by way of example only and with reference to the drawings. In FIG. 1 a dairy farm as a whole is denoted by reference numeral 2. The dairy farm 2 comprises at least one production shed, in this embodiment five production sheds 4. The dairy farm 2 further comprises a separate calving shed 6 and calf sheds 8. The production sheds 4 and the calving shed 6 are provided with milking robots 10 for automatically milking dairy animals, in this embodiment cows. The production sheds 4 and the calving shed 6 are further provided with boxes 12, water tanks 14 and feed troughs 16.

In this embodiment, the production sheds have a capacity of approximately 500 cows. Also the calving shed has a capacity of approximately 500 cows, to which belong both the cows that are dried up and the cows that are meantime in the process of inmilking. There is thus obtained a total capacity of 3,000 cows. In the calving shed 6 may be provided separate areas, such as a drying up area 18, a calving area 20, and an inmilking area 22.

In FIG. 1 the possible displacement routes of cows in the dairy farm 2 are indicated by arrows. Arrow 30 indicates that cows may be displaced from one of the production sheds 4, so not necessarily the indicated production shed, to the calving shed 6. Arrow 32 indicates that cows may be placed back to one of the production sheds 4, which production shed may be an other one than the production sheds from which the subgroup concerned has been taken. Arrow 34 indicates that cows may be displaced from the drying up area 18 to the calving area 20. By arrow 36 it is indicated that, after calving, cows may be led back to the drying up area 18, or the possibly provided separate inmilking area 22. It is indicated by arrows 38, 40, 42 that calves, in particular heifers, are led along separate areas into the calf shed 8.

Figure 3:
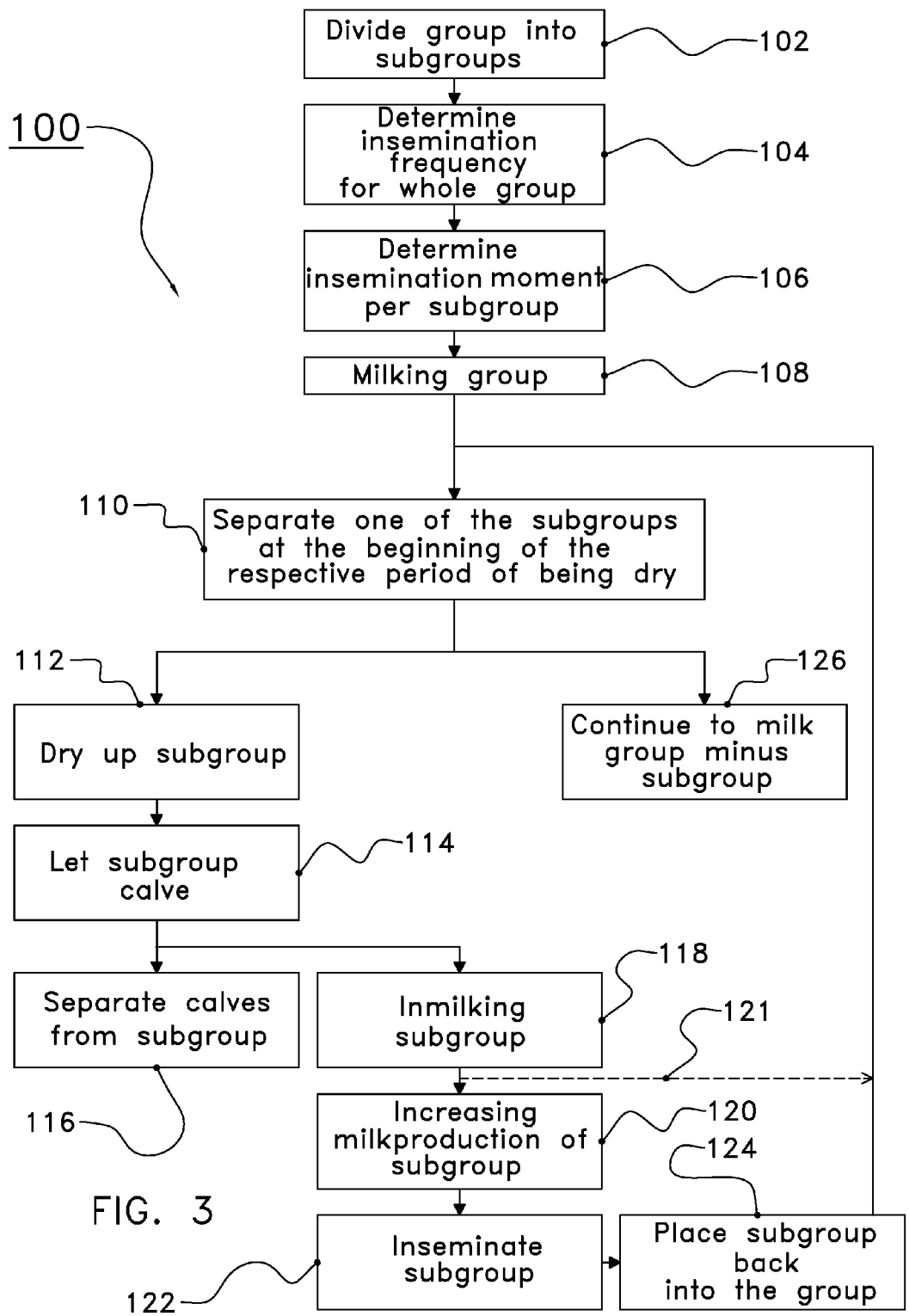
FIG. 3 shows a flowchart for a method according to the invention.

One embodiment of the method according to the invention is shown in FIG. 3. The method starts with a number of steps that are in principle performed once, prior to the other steps of the method. It should be noted that these steps to be taken once may be performed again in each case as soon as heifers are added to the group of dairy animals producing milk.

In a first operational step 102 a group of dairy animals, in particular cows, is divided into subgroups. Since there may be a plurality of groups of animals within one farm, also the term 'main group of animals' will be used hereinafter. In this case there is a relation between the total group size, the average subgroup size, and the number of subgroups. It is aimed at giving the various subgroups a comparable group size. The subgroup size depends on the size of the capacity of the calving shed and on the period of time a subgroup spends in the calving shed (see hereunder). In this embodiment, the average subgroup size is 130 cows.

In step 104 an insemination frequency is determined for the whole (sub)group of cows. This insemination frequency determines when in each case a subgroup of the main group is inseminated. This insemination of the cows of a subgroup subsequently takes place within a particular insemination period. The insemination periods of various subgroups of one main group do not overlap each other. In particular, the insemination periods of various subgroups of one main group are separated by a period of at least one week, in which period insemination does not take place. In particular, the period in which insemination does not take place is at least equal to the insemination period. Of course, inside one farm there may be a plurality of (main) groups, each main group being divided into subgroups. Subgroups of separate main groups may be more or less parallel to each other, it being possible for the insemination periods of subgroups of different main groups to overlap each other or to be contiguous to each other.

The insemination frequency depends on a chosen duration of the lactation cycle. A whole lactation cycle lasts approximately one year, but this varies per type of cow and also depends on the development, in particular the reduction of the milk production by the end of the lactation cycle. The number of subgroups is divided by the chosen duration of the lactation cycle. In this embodiment is opted for a total lactation cycle of one year, a division of the total group into 20 subgroups and thus for an insemination frequency of 20× per year. Preferably, this frequency is substantially equally distributed over the lactation cycle duration, which means inseminating 1× per 18 days a substantially whole subgroup (step 106). The insemination lasts a few hours to not more than a few days, in particular less than five days, more in particular less than three days, more in particular one day. Related to the duration of the lactation cycle the insemination period is so short that it may be stated that all cows in a subgroup are inseminated substantially simultaneously. As a result of such a short insemination period, substantially all cows in the subgroup concerned go simultaneously through the lactation cycle. Only cows with which insemination does not lead to pregnancy, do not go through the lactation cycle simultaneously with the other cows of the subgroup. These non-pregnant cows are removed from the subgroup concerned and are added to a next subgroup that will be inseminated.

The cows in the production sheds 4 are milked fully automatically in step 108 by means of the milking robots 10. Depending on their productivity, the cows concerned may be milked, for example, 3× daily by means of a milking robot 10. A few weeks prior to the average calving moment calculated for the subgroup, a subgroup is taken collectively from the production shed 4 concerned and is led to the calving shed 6 (step 110). This moment may be three to eight weeks before the expected calving moment. Compared with the state of the art, collective separation of the subgroup may cause less workload for the supporting personnel than in the case of individual separation of dairy animals.

Advantageously, a whole subgroup stays in the calving shed during the entire drying up phase. This means that both the period of reducing the milking frequency and the period in which no milking at all takes place, are spent in the calving shed. This has the advantage that cows that are still being milked, but to a lesser extent than they are accustomed to, will not continue to hang around at a milking robot 10 in their production shed 4 and thus prevent access to the milking robot for high-productive cows. In the calving shed 6 it is possible for the subgroup of cows to be dried up to obtain collectively extra attention and adapted feeding.

After the subgroup has been dried up (step 112), at any moment the first cows of a subgroup will calve. The spreading over time of the whole subgroup will be approximately 13 days, because the gestation periods of individual dairy animals may differ mutually and because the chosen insemination period is not an infinitely short period, but may cover, for example, a period of one to a few days. This means that at a subgroup size of 130 cows, on average 10 cows will calve daily. Since all dairy animals in the separated subgroup will have to calve at any moment, it is simpler to establish when the calving moment is so near that possible further measures may be taken for the animal concerned, such as extra attention and/or individual separation.

After the subgroup has calved (step 114), the calves will be separated from the subgroup (step 116). Bull calves will subsequently be bred for meat production, often outside the dairy farm. Heifers may be bred in the calf sheds 8 until a moment when they will be added logically (but not yet per se physically) to a subgroup, be inseminated together with the other cows of the subgroup, and be physically added to the subgroup concerned around the beginning of the drying up phase.

After calving, the cows concerned of the subgroup will be inmilked (step 118). Advantageously, this inmilking still takes place in the calving shed, so that it is possible to milk at an adapted frequency. It is thus also possible to separate the colostrum obtained in order to be able to feed it to the youngest calves. After the whole subgroup has been inmilked, a period of a few weeks follows in which the milk production of the subgroup concerned is increased (step 120). In this case, it is possible to milk at a higher frequency than in the case of the other production cows, for example 4× daily instead of 3× daily. This milk production increase might still take place separately in the calving shed 6. This could also take place in a production shed 4 specially designated therefore, in which case the production shed 4 concerned is preferably provided with extra milking robots or at any rate a relatively higher number of milking robots with respect to the subgroup size.

At any moment after calving the subgroup will be outplaced collectively. This outplacing may take place before inmilking, between inmilking and increasing the milk production, or after increasing the milk production. There may also take place a plurality of collective displacements, for example if there is a separate inmilking shed and/or a production shed specially designated for increasing the production, as described above. When the subgroup of which the milk production is increased leaves the calving shed, the area that has come free may be occupied by a new subgroup that will be dried up (dotted line 121).

Nine months before the calving moment aimed at of the subgroup concerned this subgroup will be inseminated again (step 122). Of course, this does not apply to cows for which it has been established that, in view of their age and/or physical condition, it will be their last lactation cycle. Advantageously, the subgroup concerned has been kept apart from the other milk producing cows until and included the moment of insemination, so that selection of the cows from the subgroup concerned and insemination of these cows is possible in a simple manner. This means that, after insemination, in operational step 124 the subgroup is placed back into the group of milk producing animals where it is milked at a normal frequency of, for example, 3× daily by means of the milking robots 10 (just like the other, non-separated cows, operational step 126).

Within the scope of the invention various variants are possible. For example, the method may also be applied to other animals than cows. The method may be applied using deviating capacities and to subgroup sizes of more or fewer animals. As a result thereof, the number of cows calving daily will be different from 10. In an advantageous variant, the capacity of the dairy farm is doubled by using two calving sheds and totally ten production sheds. In that case, the calving sheds are provided (viewed in the direction of the drawing) one above the other, the production sheds being located to the left and to the right of the calving sheds. In that case, there will be a main group of dairy animals per calving shed with, in this embodiment five, production sheds. This main group is classified into subgroups in the above described manner.

The method may be performed to a greater or lesser extent in an automated manner. Dividing cows into subgroups and planning the moments when insemination, separation and displacement should take place, may be recorded in a database program. If desired, the program concerned may be linked to a system for recognizing cows, to robots for selecting and driving cows, and to automatic gates between the production sheds and the calving shed. Selecting cows and displacing these cows to the calving shed may also take place manually. Milking the cows in the calving shed, at the beginning of the drying up, and inmilking may also take place by means of an ordinary milking machine instead of a milking robot. In a simple embodiment, however, the method described could also be performed by means of a physical card tray.

Thus, the invention has been described by reference to certain embodiments discussed above. It will be recognized that these embodiments are susceptible to various modifications and alternative forms well known to those of skill in the art. Accordingly, although specific embodiments have been described, these are examples only and are not limiting upon the scope of the invention. The person skilled in the art will be able to apply various modifications and adaptations within the scope of the invention, the scope of protection for the invention being determined by the accompanying claims.

What is claimed is:

1. A system for managing a group of dairy animals to be milked fully automatically, which dairy animals go through a lactation cycle comprising phases of calving, inmilking, producing milk, and being dry, the system comprising:
   a computer executing program instructions for recording information and processing data indicating:
      a division of the group of dairy animals into subgroups of a plurality of dairy animals,
      an insemination period determined per subgroup within which the dairy animals of the subgroup concerned are to be inseminated, which insemination period is so short that substantially all dairy animals in the subgroup concerned go simultaneously through the lactation cycle, and
      a separation of pregnant dairy animals of at least one of the subgroups in a separate area, around the beginning of the being dry phase of the subgroup concerned; and
   at least one milking robot for automatically milking the dairy animals, the at least one milking robot operatively connected to the computer for receiving first instructions from the computer for milking the dairy animals in the non-separated subgroups, and second instructions from the computer for milking the dairy animals in the separated subgroup in the separate area.

2. The system according to claim 1, wherein the at least one milking robot comprises:
   a first milking robot operatively connected to the computer for receiving first instructions from the computer for milking the dairy animals in the non-separated subgroups; and
   a second milking robot for automatically milking the dairy animals in the separate area, the second milking robot operatively connected to the computer for receiving second instructions from the computer for milking the dairy animals in the separated subgroup.

3. The system according to claim 1, wherein the second instructions received by the at least one milking robot are for milking the dairy animals of the separated subgroup at a decreasing frequency in order to dry up the dairy animals of the separated subgroup.

4. The system according to claim 1, wherein the second instructions received by the at least one milking robot are for milking the dairy animals of the separated subgroup at an increased frequency during inmilking.

5. The system according to claim 1, further comprising a selection robot operatively connected to the computer for automatically separating the pregnant dairy animals of the at least one subgroup.

6. The system according to claim 1, wherein the computer records information and sends instructions to the at least one milking robot indicating placement of the separated subgroup out of the separate area after being dry and calving.

7. The system according to claim 1, wherein the computer records information and sends instructions to the at least one milking robot indicating separation of at least one of the subgroups from the group until at least after the inmilking.

8. The system according to claim 7, wherein the computer records information and sends instructions to the at least one milking robot indicating separation of at least one of the subgroups from the group during a first part of the lactation cycle after calving in which the milk production increases, and milking at a higher frequency than dairy animals in the rest of the group.

9. The system according to claim 1, wherein the computer records information and sends instructions to the at least one milking robot relating to classification of dairy animals of a subgroup which have not become pregnant after insemination into an other subgroup in order to be inseminated again together with the dairy animals of this other subgroup.

10. A computer usable medium having computer readable program instructions embodied therein for recording information and processing data, and for issuing instructions, as defined in claim 1.

11. A method of managing a group of dairy animals to be milked fully automatically, which dairy animals go through a lactation cycle comprising phases of calving, inmilking, producing milk, and being dry, the method comprising:
   dividing the group of dairy animals into subgroups of a plurality of dairy animals;
   determining per subgroup an insemination period within which the dairy animals of the subgroup concerned are inseminated, which insemination period is so short that substantially all dairy animals in the subgroup concerned go simultaneously through the lactation cycle;
   separating all pregnant dairy animals of at least one of the subgroups in a separate area, around the beginning of the being dry phase of the subgroup concerned;
   fully automatically milking the dairy animals in the non-separated subgroups by means of at least one milking robot;
   separately milking the dairy animals in the separated subgroup; and
   placing the separated subgroup out of the separate area after being dry and calving.

12. The method according to claim 11, wherein at least one of the subgroups, after calving, remains separated from the group at least during the inmilking.

13. The method according to claim 12, wherein the at least one subgroup, after calving, also remains separated from the group during a first part of the lactation cycle in which the milk production increases, and is milked at a higher frequency than dairy animals in the rest of the group.

14. The method according to claim 11, wherein dairy animals of a subgroup which have not become pregnant after insemination are classified into an other subgroup in order to be inseminated again together with the dairy animals of this other subgroup.

15. The method according to claim 11, wherein the separated subgroup is milked fully automatically by means of a separate milking robot, which milking robot is controlled to milk at a decreasing frequency in order to dry up the dairy animals of the separated subgroup.

16. The method according to claim 11, wherein the subgroups have mutually a substantially equal group size.

17. The method according to claim 11, wherein placing the separated subgroup out of the separate area is followed by placing back the separated subgroup into at least one non-separated subgroup.

* * * * *